(12) United States Patent
Tambasco

(10) Patent No.: US 12,372,722 B2
(45) Date of Patent: Jul. 29, 2025

(54) MULTIMODE WAVEGUIDE WITH ADIABATIC TE0 MODE ADD/DROP FILTER

(71) Applicant: Cisco Technology, Inc., San Jose, CA (US)

(72) Inventor: Jean-Luc Joseph Tambasco, Macungie, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 293 days.

(21) Appl. No.: 18/096,125

(22) Filed: Jan. 12, 2023

(65) Prior Publication Data

US 2024/0241315 A1 Jul. 18, 2024

(51) Int. Cl.
*G02B 6/126* (2006.01)
*G02B 6/12* (2006.01)
(Continued)

(52) U.S. Cl.
CPC ........... *G02B 6/126* (2013.01); *G02B 6/1228* (2013.01); *G02B 6/2773* (2013.01); *G02B 2006/1209* (2013.01); *G02B 2006/12164* (2013.01)

(58) Field of Classification Search
CPC .... G02B 6/126; G02B 6/1228; G02B 6/2773; G02B 2006/1209; G02B 2006/12164
See application file for complete search history.

(56) References Cited

U.S. PATENT DOCUMENTS

| | | | |
|---|---|---|---|
| 11,635,570 B1 * | 4/2023 | Thompson | G02B 6/1228 385/28 |
| 11,747,559 B2 * | 9/2023 | Bian | G02B 6/1228 385/43 |

(Continued)

FOREIGN PATENT DOCUMENTS

| | | |
|---|---|---|
| CN | 107167873 A | 9/2017 |
| CN | 105866893 A | 1/2019 |

(Continued)

OTHER PUBLICATIONS

Shi, W., et al., "Silicon photonic Bragg-grating couplers for optical communications," Invited Paper, Proceedings of SPIE—The International Society for Optical Engineering, https://www.researchgate.net/publication/269323655_Silicon_photonic_Bragg-grating_couplers_for_optical_communications, Feb. 2014, 13 pages.

(Continued)

*Primary Examiner* — Uyen Chau N Le
*Assistant Examiner* — Eric Paul Struth
(74) *Attorney, Agent, or Firm* — Edell, Shapiro & Finnan, LLC

(57) ABSTRACT

A device and method are provided. The device includes a bus waveguide having a longitudinal axis, a lower waveguide disposed on a first side of the bus waveguide, and an upper waveguide disposed on a second side of the bus waveguide opposite to the first side of the bus waveguide, wherein the upper waveguide substantially matches a path of the lower waveguide. The method includes receiving a $TE_1$ mode optical signal on a bus waveguide, receiving a $TE_0$ mode optical signal on a lower waveguide disposed below the bus waveguide, mode multiplexing the $TE_1$ mode optical signal and the $TE_0$ mode optical signal without converting the $TE_0$ mode optical signal or the $TE_1$ mode optical signal to another mode, and outputting the $TE_0$ mode optical signal and the $TE_1$ mode optical signal on the bus waveguide.

20 Claims, 12 Drawing Sheets

(51) Int. Cl.
    *G02B 6/122*     (2006.01)
    *G02B 6/27*     (2006.01)

(56) References Cited

U.S. PATENT DOCUMENTS

| | | | | |
|---|---|---|---|---|
| 12,158,607 | B2* | 12/2024 | Yamashita | G02B 6/2821 |
| 2015/0104128 | A1 | 4/2015 | Oka et al. | |
| 2018/0284348 | A1 | 10/2018 | Lin | |
| 2018/0314005 | A1* | 11/2018 | Lin | G02B 6/126 |
| 2019/0222309 | A1* | 7/2019 | Gross | H04B 10/85 |
| 2019/0243066 | A1 | 8/2019 | Mahgerefteh et al. | |
| 2019/0384003 | A1* | 12/2019 | Painchaud | G02B 6/2821 |
| 2020/0116939 | A1 | 4/2020 | Wang et al. | |
| 2021/0109281 | A1 | 4/2021 | Ling et al. | |
| 2023/0224040 | A1 | 7/2023 | Lin et al. | |

FOREIGN PATENT DOCUMENTS

| | | |
|---|---|---|
| WO | 2018014365 A1 | 1/2018 |
| WO | 2022062676 A1 | 3/2022 |

OTHER PUBLICATIONS

Okayama, H., et al., "Silicon wire waveguide TE0/TE1 mode conversion Bragg grating with resonant cavity section," Optics Express, Research Article, vol. 25, No. 14, https://opg.optica.org/oe/fulltext.cfm?uri=oe-25-14-16672&id=369014, Jul. 2017, 9 pages.

Qiu, H., et al., "Silicon add-drop filter based on multimode Bragg sidewall gratings and adiabatic couplers," Journal of Lightwave Technology, vol. 35, No. 9, https://ieeexplore.ieee.org/document/7851086/authors#authors, Feb. 2017, 5 pages.

Park, T., et al., "Optimization of Tilted Bragg Grating Tunable Filters Based on Polymeric Optical Waveguides," Current Optics and Photonics, vol. 1, No. 3, https://doi.org/10.3807/COPP.2017.1.3.214, Jun. 2017, 7 pages.

Jafari, O., et al., Mode-conversion-based silicon photonic modulator loaded by a combination of lateral and interleaved p-n junctions, Research Article, vol. 9, No. 4, Photonics Research, https://doi.org/10.1364/PRJ.414400, Apr. 2021, 6 pages.

Wang, X., et al., "Hitless and gridless reconfigurable optical add drop (de)multiplexer based on looped waveguide sidewall Bragg gratings on silicon," Research Article, vol. 28, No. 10, Optics Express, https://opg.optica.org/OE/fulltext.cfm?uri=oe-28-10-14461&id=431329, May 2020, 15 pages.

Xie, S., et al., "Add-drop filter with complex waveguide Bragg grating and multimode interferometer operating on arbitrarily spaced channels," Optics Letters, vol. 43, No. 24, https://opg.optica.org/ol/abstract.cfm?uri=ol-43-24-6045, Dec. 2018, 4 pages.

Qiu, H., et al., "Silicon band-rejection and band-pass filter based on asymmetric Bragg sidewall gratings in a multimode waveguide," Optics Letters, vol. 41, Issue 11, https://opg.optica.org/ol/abstract.cfm?uri=ol-41-11-2450, Jun. 2016, 1 page.

Liu D., et al., "Four-Channel CWDM (de)Multiplexers Using Cascaded Multimode Waveguide Gratings", IEEE Photonics Technology Letters, vol. 32, No. 4, Feb. 15, 2020, pp. 192-195.

Xiao R., et al., "Integrated Bragg Grating Filter With Reflection Light Dropped via Two Mode Conversions", Journal of Lightwave Technology, vol. 37, No. 9, May 1, 2019, pp. 1946-1953.

\* cited by examiner

MULTIMODE WAVEGUIDE WITH ADIABATIC TE0 MODE ADD/DROP FILTER

TECHNICAL FIELD

Embodiments described herein are directed to a photonic device, and specifically to an adiabatic add/drop filter.

BACKGROUND

A photonic device is designed to have components with minimal loss, footprint and, if possible, complexity. Propagation loss, back-reflection, high power handling, extinction ratio and yield all, ultimately, have an impact on the optical link performance of the device.

One component of interest is a mode multiplexer (often referred to as a "modemux"). A modemux is a general purpose photonic component, which can be used, for example, with a polarization rotator to form a polarization splitter rotator (PSR), or in a receiver's integrated wavelength division multiplexing (WDM) filter used in, e.g., the O-band. Such a filter is generally designed to desired specifications including accurate channel center and width, as well as steep channel edge roll off and extinction ratio. Some platforms use a set of integrated Bragg gratings for the core filtering process. In some implementations, these gratings may be combined with supporting adiabatic components including adiabatic bends and adiabatic interlayer transitions.

A photonic filter is also characterized by insertion loss (IL) and return loss (RL). Link budget, which is related directly to IL, is a premium on the receive path (compared to the transmit path). The RL of a given receiver is impacted not only by filter design, but also by fiber couplers, photodetectors (e.g., a GePD), variable optical attenuators (VOAs), Si routing, and potentially a PSR.

One integrated Bragg WDM filter architecture uses back-reflection to form a spectral reject or "drop" band, and forward transmission as a spectral "pass" band. Using back-reflection to form a drop band, while producing excellent filtering performance, is clearly at odds with RL. In this architecture, receiver RL is equal to approximately four times the cross-talk of an individual adiabatic modemux. For example, a −30 dB cross-talk modemux (which is already considered very good for a modemux) used in such an integrated WDM filter result in −24 dB of RL, which may fall short of a desired still lower RL. Estimates of the cross-talk needed to comfortably meet the return loss specification on a receiver place the required cross-talk of the adiabatic modemux at approximately less than −36 dB. It is desired that the low cross-talk not come at the cost of added IL or a burdensome footprint.

A typical modemux converts $TE_1$ to $TE_0$ of an isolated waveguide. However, this act of converting $TE_1$ to $TE_0$ creates undesirable cross-talk.

DETAILED DESCRIPTION

Overview

Figure 1:
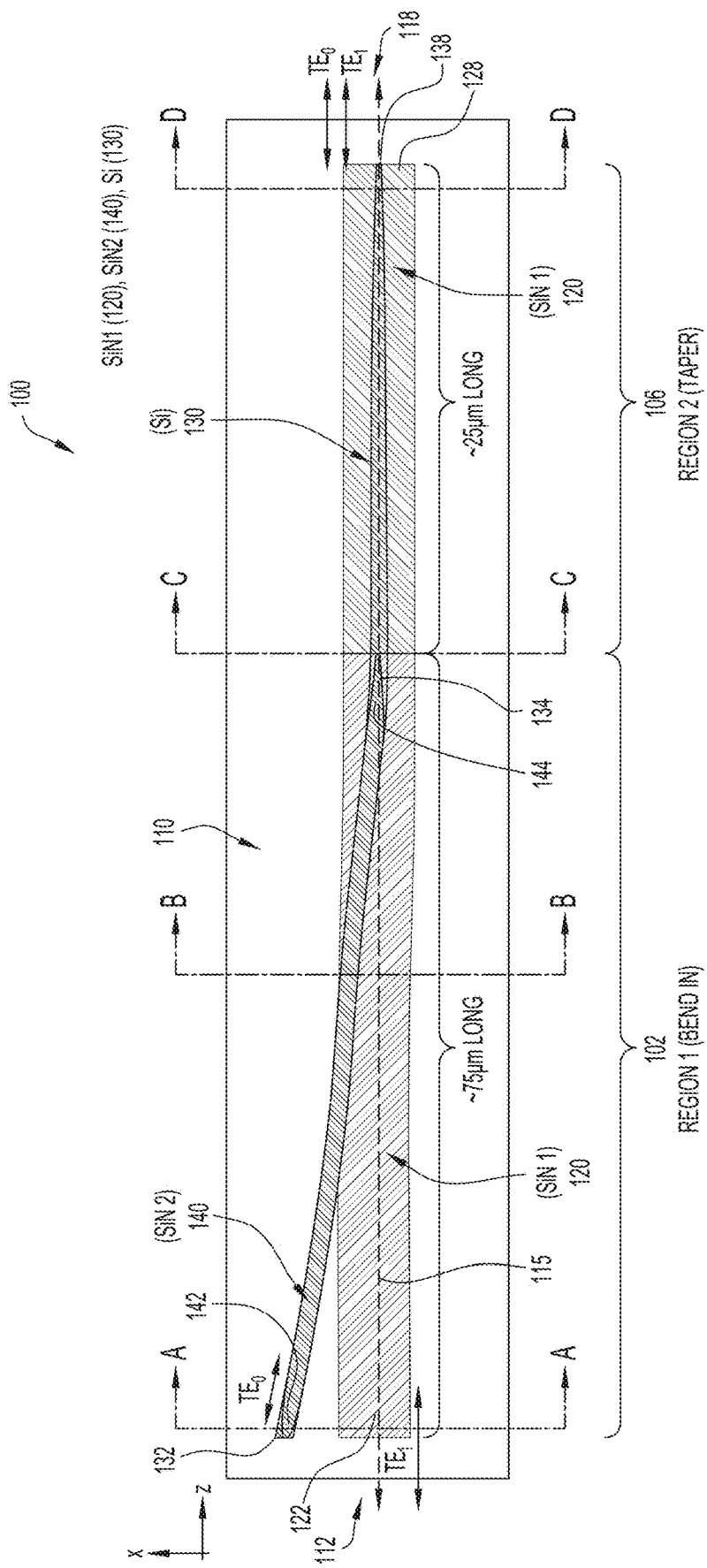
FIG. 1 shows a plan view of a modemux, according to an example embodiment.

Presented herein is a device that includes a bus waveguide having a longitudinal axis, a lower waveguide disposed on a first side of the bus waveguide, and an upper waveguide disposed on a second side of the bus waveguide opposite to the first side of the bus waveguide, wherein the upper waveguide substantially matches a path of the lower waveguide.

In another embodiment, a device is provided that includes a bus waveguide having a longitudinal axis, a lower waveguide disposed below the bus waveguide, and an upper waveguide disposed above the bus waveguide. The bus waveguide is arranged linearly from a first end of the device to a second end of the device. The lower waveguide translates from a non-overlapping position to an overlapping position as the lower waveguide extends from the first end of the device to the second end of the device. The lower waveguide further tapers in the overlapping position towards the second end of the device. The upper waveguide extends along a path that at least partially matches the lower waveguide.

In yet another embodiment, a method is provided. The method includes receiving a $TE_1$ mode optical signal on a bus waveguide, receiving a $TE_0$ mode optical signal on a lower waveguide disposed below the bus waveguide; mode multiplexing the $TE_1$ mode optical signal and the $TE_0$ mode optical signal without converting the $TE_0$ mode optical signal or the $TE_1$ mode optical signal to another mode, and outputting the $TE_0$ mode optical signal and the $TE_1$ mode optical signal on the bus waveguide.

EXAMPLE EMBODIMENTS

Described below is a photonic component or device that operates to strip out or filter TE0 mode light from a multimode waveguide. In one embodiment, a "bus" waveguide comprised of silicon nitride is disposed on a layer of a substrate and remains substantially unchanged along the length of the device. The bus waveguide has a substantially rectangular shape that does not translate (i.e., bend, shift or angle toward or away from a longitudinal axis). The bus waveguide may support at least $TE_0$, $TE_1$, and $TM_0$ guided modes. In one implementation, a lower waveguide comprised of silicon is disposed on a lower layer of the substrate below the bus waveguide, and an upper waveguide comprised of silicon nitride is disposed on an upper layer of the substrate above the bus waveguide. The lower waveguide and the upper layer, in a bend-in region in a first portion of the device, follow substantially the same paths and are translated from non-overlapping positions to overlapping positions with respect to the bus waveguide. The upper and lower waveguides are provided to create a "pseudo-symmetry", which avoids $TE_1$-$TM_0$ mode hybridization. The lower waveguide may taper towards one end of the bend-in region and end. A taper region characterizes a second portion of the device in which the upper waveguide extends toward an end of the device and tapers toward that end.

In a second implementation, the upper waveguide is eliminated and the lower waveguide is disposed further away from the bus waveguide. This increased separation reduces the $TM_0$ index to avoid mode hybridization.

Those skilled in the art will appreciate that the terms "lower" and "upper" are not meant to suggest strict orientation, and are merely meant to denote a relationship between layers or indicate a relative position, not necessarily that one layer is above or below another layer (e.g., in use, the actual orientation of the device may dictate which layer or waveguide may be referred to as an "upper" or "lower" layer or waveguide, such that the described upper layer or waveguide is actually below the lower layer or waveguide).

More specifically, the present disclosure provides a multimode waveguide with an adiabatic TE0 add/drop filter in the form of a modemux that takes optical power in the $TE_0$ mode of a high index waveguide, and adiabatically transfers it into the $TE_0$ mode of a lower index, multimode waveguide. The modemux is designed to have low $TE_0$-$TE_1$ cross-talk by ensuring that when the $TE_0$ multiplexing (muxing) takes place, either: (1) symmetry is used to negate scattering between even and odd modes, or (2) the effective indices of $TE_0$ (in Si) and $TE_1$ (in SiN) are substantially different (i.e., result in negligible phase-matching between the two modes).

The overall length of the disclosed device is relatively short. A traditional SiN modemux may be on the order of 200-400 µm long, whereas the modemux described herein is either on the order of ~100-120 µm long (e.g., first example embodiment of FIGS. 1 and 2A-2C) or on the order of ~200-250 µm long (e.g., second example embodiment of FIGS. 5A-5B). Thus, the adiabatic modemux of this disclosure has a smaller footprint than many existing modemuxes.

The adiabatic modemux may be used in a WDM filter architecture in the O-band, or in various other applications relating to polarization rotating, multiplexing, $TE_1$ generation and component characterization. A significant challenge in obtaining a viable modemux using this scheme is overcoming unwanted $TE_1$-$TM_0$ mode hybridization. Notably, this challenge can be overcome using the modemux described herein.

As those skilled in the art will come to understand, the photonic component of the present disclosure does not work in the conventional sense, in that the multi-layer modemux transmits $TE_1$ as $TE_1$ (instead of converting $TE_1$ to $TE_0$ like a standard modemux does), and multiplexes $TE_0$ onto a $TE_1$-carrying waveguide.

Figure 2A:
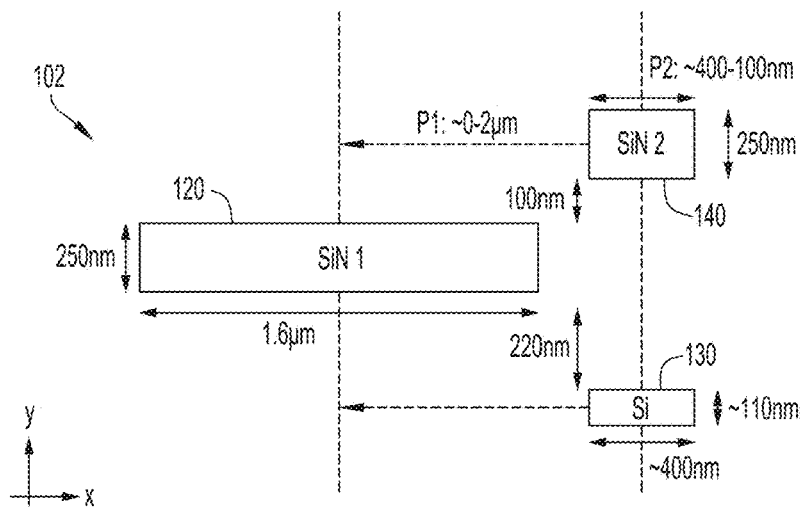
FIGS. 2A, 2B, and 2C show, respectively, cross-sectional views at A-A, B-B, and C-C of the modemux shown in FIG. 1, according to an example embodiment.
Figure 2B:
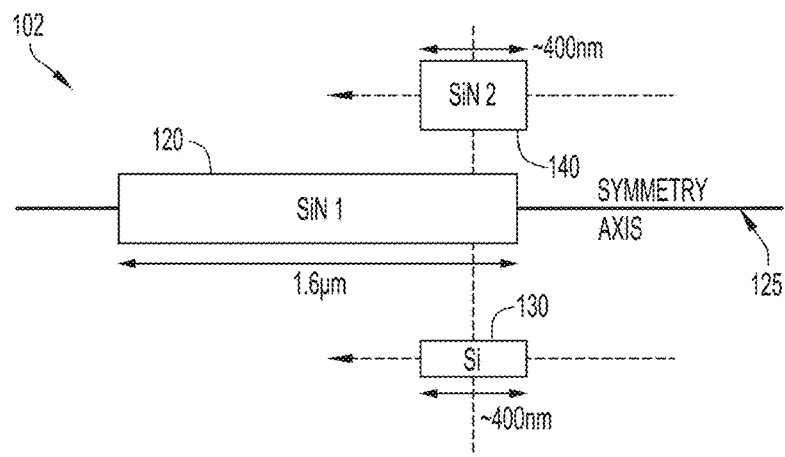
Figure 2C:
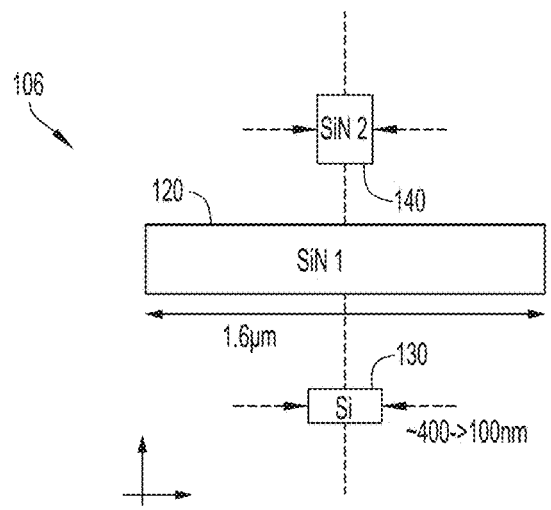

Reference is now made to the figures, beginning with FIG. 1, which shows a plan view of a modemux 100, according to an example embodiment, and to FIGS. 2A, 2B and 2C, which show, respectively, cross-sectional views taken at A-A, B-B, and C-C of modemux 100 shown in FIG. 1, according to an example embodiment. Modemux 100 comprises two regions: a first region 102 (or "bend in" region) and a second region 106 (or "taper" region). Those skilled in the art will appreciate, however, that these denoted regions are merely meant to help describe the modemux 100, and are not meant to suggest any clear or specific boundaries between different regions, or that any particular functionality is performed exclusively in any given region.

Modemux 100 is fabricated within/on a substrate 110 (e.g., silicon dioxide) that includes a first edge 112 and a second edge 118. As shown in FIG. 1, modemux 100 includes a bus waveguide 120 that is disposed in/on the substrate 110, and extends between the first edge 112 and the second edge 118 (e.g., along a longitudinal axis 115 in the z-axis direction). The bus waveguide 120 has a first end 122 (at first edge 112 of substrate 110) and a second end 128 (at second edge 118 of substrate 110). In an example embodiment, bus waveguide 120 is comprised of silicon nitride (denoted as "SiN 1" in the figures), and has a substantially rectangular cross-section that remains substantially unchanged along its length. The bus waveguide 120 may have a width (in the x-axis direction) of about 1.6 µm, and a thickness (in the y-axis direction) of about 250 nm. The bus waveguide 120 may be bimodal (in TE), thus supporting, at least, both $TE_0$ and $TE_1$ modes.

As shown in FIG. 1, modemux 100 also includes a lower waveguide 130 disposed in/on the substrate 110 below the bus waveguide 120, and an upper waveguide 140 disposed in/on the substrate 110 above the bus waveguide 120. Lower waveguide 130 and upper waveguide 140 extend from first edge 112 towards second edge 118, and at least partially overlie bus waveguide 120. At the first edge 112 of the substrate 110, the lower waveguide 130 has an untapered end 132, and the upper waveguide 140 has a first end 142 that slightly narrows (or tapers) in the x-axis direction (e.g., to better match physical dimensions of prior or follow-on optical components). In an example embodiment, the lower waveguide 130 is comprised of silicon (denoted as "Si" in the figures) and the upper waveguide 140 is comprised of silicon nitride (denoted as "SiN 2" in the figures). The lower waveguide 130 may have a width (in the x-axis direction) that ranges from about 400 nm to 100 nm, and a thickness (in the y-axis direction) of about 110 nm. At the second edge 118 of the substrate 110, the lower waveguide 130 has a tapered end 138 that narrows (or tapers) in the x-axis direction.

The width of the lower waveguide 130 may remain substantially unchanged in (bend in) first region 102, and may gradually narrow or taper in the x-axis direction along the length of (taper) second region 106 (in the z-axis direction, from left to right in FIG. 1). In an example embodiment, the upper waveguide 140 may have a width (in the x-axis direction) that ranges from about 400 nm to 100 nm, and a thickness (in the y-axis direction) of about 250 nm. The width of the upper waveguide 140 may also narrow or taper in the x-axis direction in (bend in) first region 102 at a second end 144 of the upper waveguide 140. The first end 142 and the second end 144 of the upper waveguide 140 and the tapered end 138 of the lower waveguide 130 may have a width (in the x-axis direction) of about 100 nm wide at their respective tips.

In (bend in) first region 102, moving from left to right in FIG. 1, the lower waveguide 130 (Si) and the upper waveguide 140 (SiN 2) both bend in towards the longitudinal axis 115. At cross-section A-A, the lower waveguide 130 and the upper waveguide 140 (at untapered end 132 and first end 142) do not overlap with the bus waveguide 120. From cross-section A-A to cross-section B-B, the lower waveguide 130 and the upper waveguide 140 both translate in the x-axis direction towards the longitudinal axis 115, and begin to partially overlap with the bus waveguide 120. From cross-section B-B to cross-section C-C, the lower waveguide 130 and the upper waveguide 140 both continue translating in the x-axis direction towards the longitudinal axis 115 and both overlap with the bus waveguide 120. In (taper) second region 106, continuing from left to right in FIG. 1, the lower waveguide 130 no longer translates in the x-axis direction. From cross-section C-C to cross section D-D, the lower waveguide 130 overlaps with the bus waveguide 120.

In an example embodiment, the bus waveguide 120, the lower waveguide 130, and the upper waveguide 140 are arranged/patterned/defined on/in a low index (e.g., silicon dioxide) cladding. Also, as shown in FIGS. 2A, 2B and 2C, the lower waveguide 130 and the upper waveguide 140 may be unequally offset from each other with respect to a symmetry axis 125. That is, in an example embodiment, the lower waveguide 130 may be separated from the bus waveguide 120 (in the y-axis direction) by about 220 nm, while the upper waveguide 140 may be separated from the bus waveguide (in the y-axis direction) by about 100 nm.

In this particular implementation, (bend in) first region 102 (between A-A and C-C) may have a length (in the z-axis direction) of about 75 μm, and (taper) second region 106 (between C-C and D-D) may have a length (in the z-axis direction) of about 25 μm. However, these regions or sections of modemux 100 may have different lengths according to other implementations (e.g., as described below with reference to FIGS. 5A and 5B).

FIG. 2A shows (bend in) first region 102 at cross section A-A of FIG. 1, where the untapered end 132 of the lower waveguide 130 and the first end 142 of the upper waveguide 140 do not overlap with the first end 122 of the bus waveguide 120. Bus waveguide 120 (SiN 1) has a width of about 1.6 μm in the x-axis direction, and a thickness of about 250 nm in the y-axis direction. Lower waveguide 130 (Si) has a width of about ~400 nm in the x-axis direction, and a thickness of about 110 nm in the y-axis direction. There is a gap about 220 nm between the bus waveguide 120 (SiN 1) and the lower waveguide 130 (Si). Upper waveguide 140 (SiN 2) has a length of about ~400 nm in the x-axis direction, and a width of about 250 nm in the y-axis direction. There is a gap about 100 nm between the bus waveguide 120 (SiN 1) and the upper waveguide 140 (SiN 2). In (bend in) first region 102, the lower waveguide 130 (Si) and the upper waveguide 140 (SiN 2) both translate (bend inward) in the x-direction (shift from right to left in FIG. 2A).

Figure 4A:
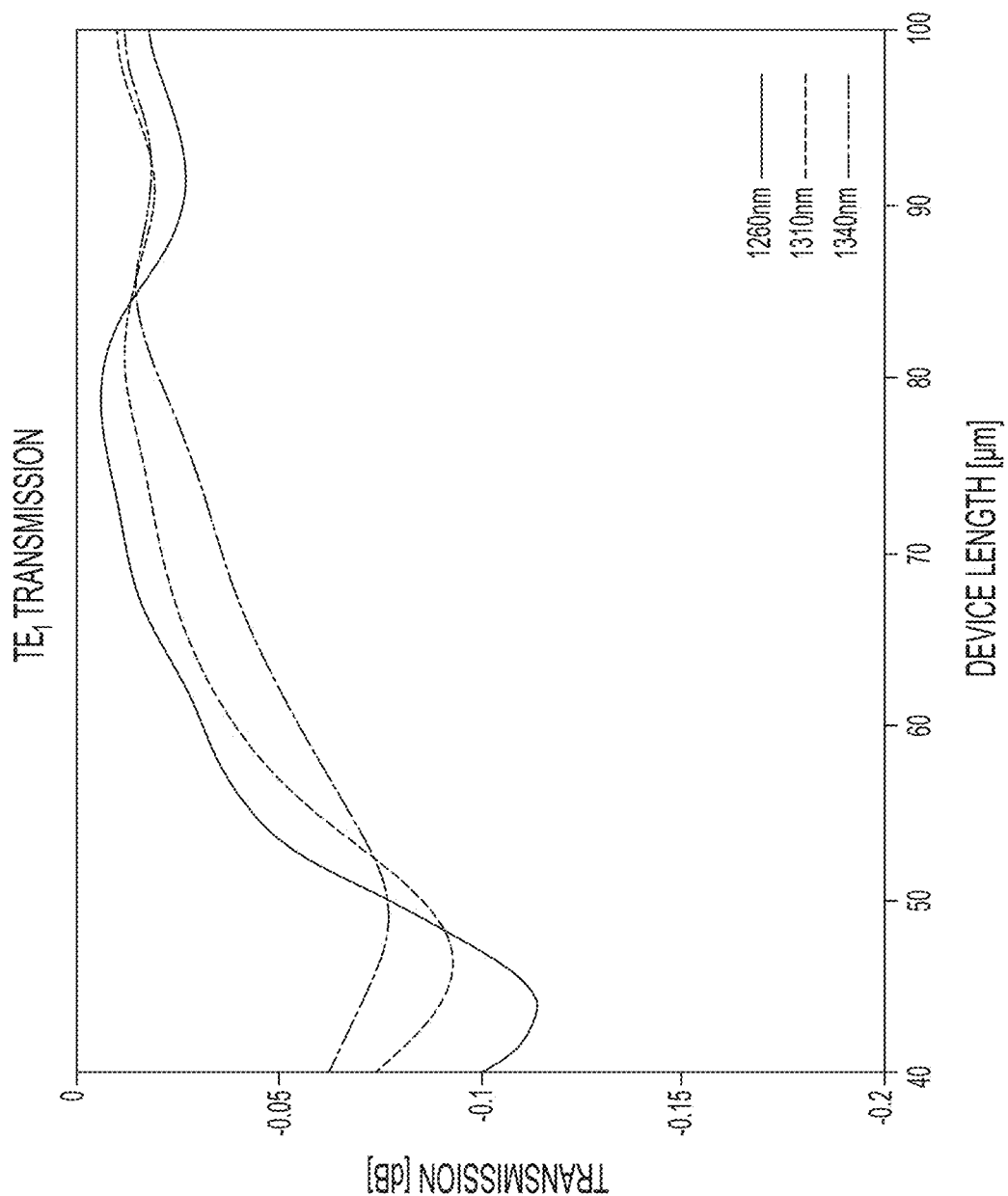
FIG. 4A is a graph showing $TE_1$ transmission of the modemux, according to an example embodiment.
Figure 4B:
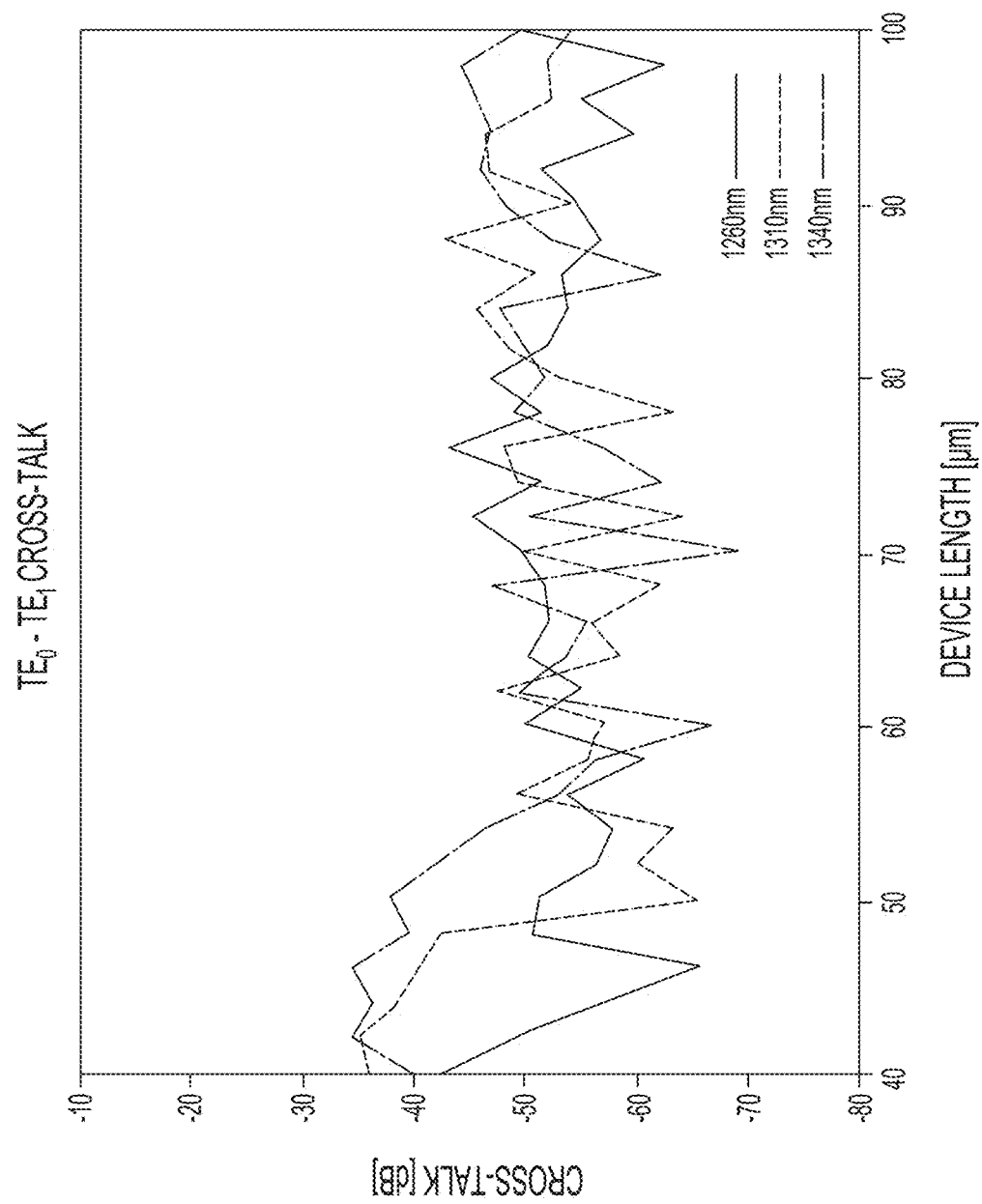
FIG. 4B is a graph showing $TE_0$-$TE_1$ cross-talk of the modemux, according to an example embodiment.

FIG. 2B shows (bend in) first region 102 at cross section B-B of FIG. 1, where the lower waveguide 130 and the upper waveguide 140 begin to overlap with the bus waveguide 120. That is, as the lower waveguide 130 (Si) and the upper waveguide 140 (SiN 2) translate (bend in) towards the longitudinal axis 115, they begin to overlap with the bus waveguide 120 in FIG. 2B. (Bend in) first region 102 has a length in the z-axis direction of about ~75 μm (refer to FIG. 1). With the disclosed dimensional configuration, there is less than ~45 dB of cross-talk ($TE_0 \rightarrow TE_1$) as shown in FIG. 4B, and insertion loss (excluding propagation loss) is less than 0.03 dB as shown in FIG. 4A.

FIG. 2C shows (taper) second region 106 at cross section C-C of FIG. 1, where the lower waveguide 130 overlaps with the bus waveguide 120. In FIG. 2C, the bus waveguide 120 (SiN 1) maintains the same width of 1.6 μm in the x-axis direction, while the lower waveguide 130 (Si) and the upper waveguide 140 (SiN 2) both narrow (taper) in width in the x-axis direction (e.g., from about ~400 nm down to about ~100 nm). (Taper) second region 106 has a length in the z-axis direction of about ~25 μm (refer to FIG. 1). Theoretically, no cross-talk occurs in second region 106. Thus, the modemux 100 has an overall device length on the order of about ~100 μm and very low cross-talk according to the first example embodiment.

Ideally, the structure shown in FIGS. 2A-2C may have include a second nitride layer (e.g., upper waveguide 140 (SiN 2)). However, when a silicon layer (e.g., lower waveguide 130 (Si)) and a nitride layer (e.g., bus waveguide 120 (SiN 1)) are close to each other, translating the silicon layer (lower waveguide 130) across the nitride layer (bus waveguide 120) can result in $TE_1$-$TM_0$ mode hybridization. Without a second nitride layer (e.g., upper waveguide 140 (SiN 2)), the structure would be asymmetric in the horizontal axis (the optical axis would have a diagonal component), and would function as a bad polarization rotator (with some of the input light rotated to TM).

In accordance with an embodiment, disposing a nitride component (e.g., upper waveguide 140 (SiN 2)) in the structure shown in FIGS. 2A, 2B and 2C creates a "pseudo-symmetry" (e.g., about symmetry axis 125 shown in FIG. 2B), such that the structure is symmetric enough in the horizontal axis (with a minimal diagonal component in the optical axis) to prevent this $TE_1$-$TM_0$ mode hybridization. Thus, in the first example embodiment, the second nitride layer (e.g., upper waveguide 140 (SiN 2)) shifts together with (and follows the same path as) the silicon layer (e.g., lower waveguide 130 (Si)) to "symmetrize" the design.

Figure 3A:
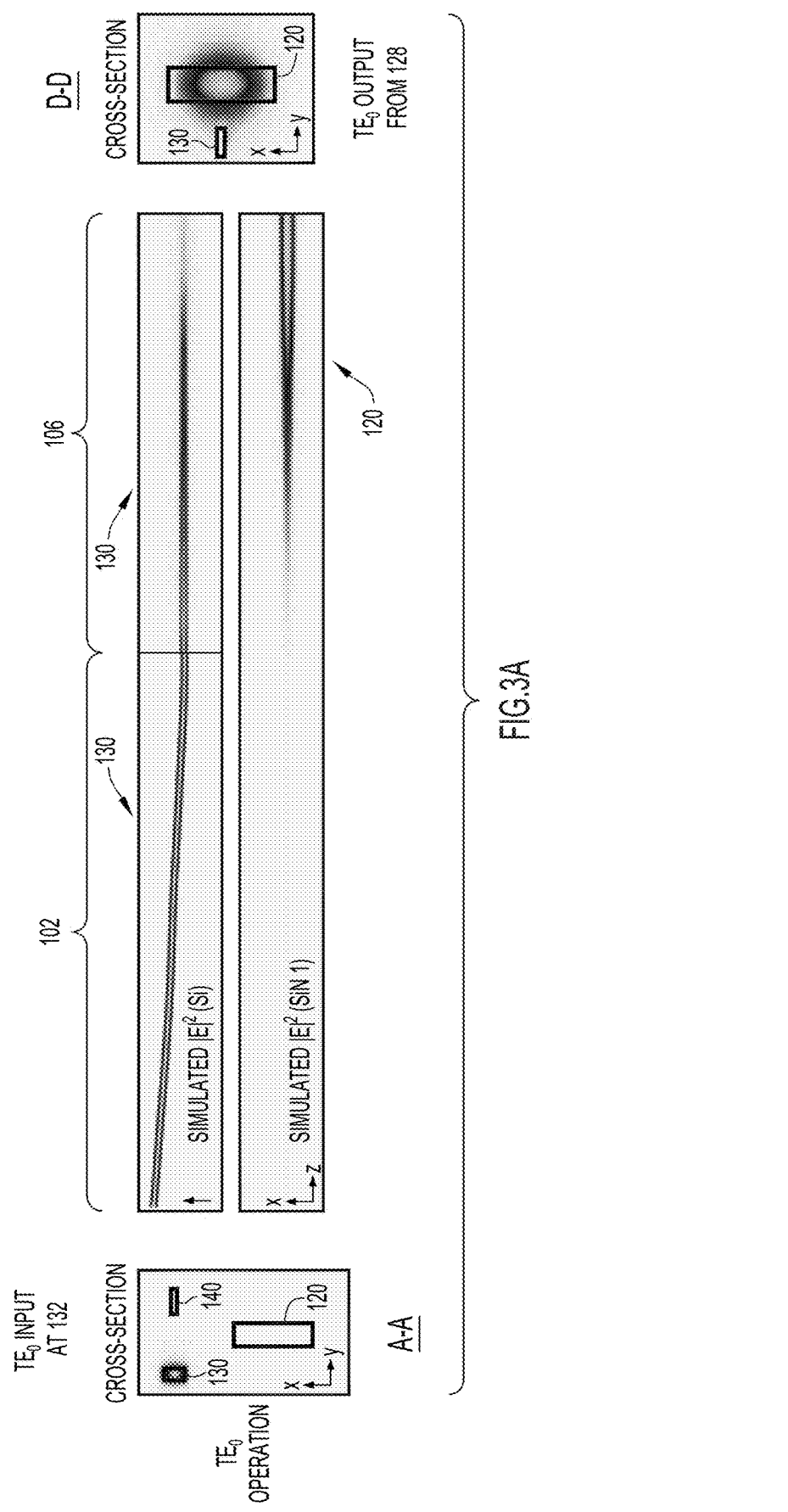
FIGS. 3A, 3B, and 3C show simulated power along a bus waveguide, a lower waveguide, and an upper waveguide of the modemux, according to an example embodiment.

FIG. 3A shows simulated optical power of a $TE_0$ mode light signal passing through the lower waveguide 130 (Si) and the bus waveguide 120 (SiN 1) of the modemux 100. The left side of FIG. 3A shows a cross-section of bus waveguide 120 at first end 122, lower waveguide 130 at untapered end 132, and upper waveguide 140 at first end 142 (i.e., at A-A in FIG. 1). The right side of FIG. 3A shows a cross-section of bus waveguide 120 at second end 128 and lower waveguide 130 at tapered end 138 (i.e., at D-D in FIG. 1).

Figure 3B:
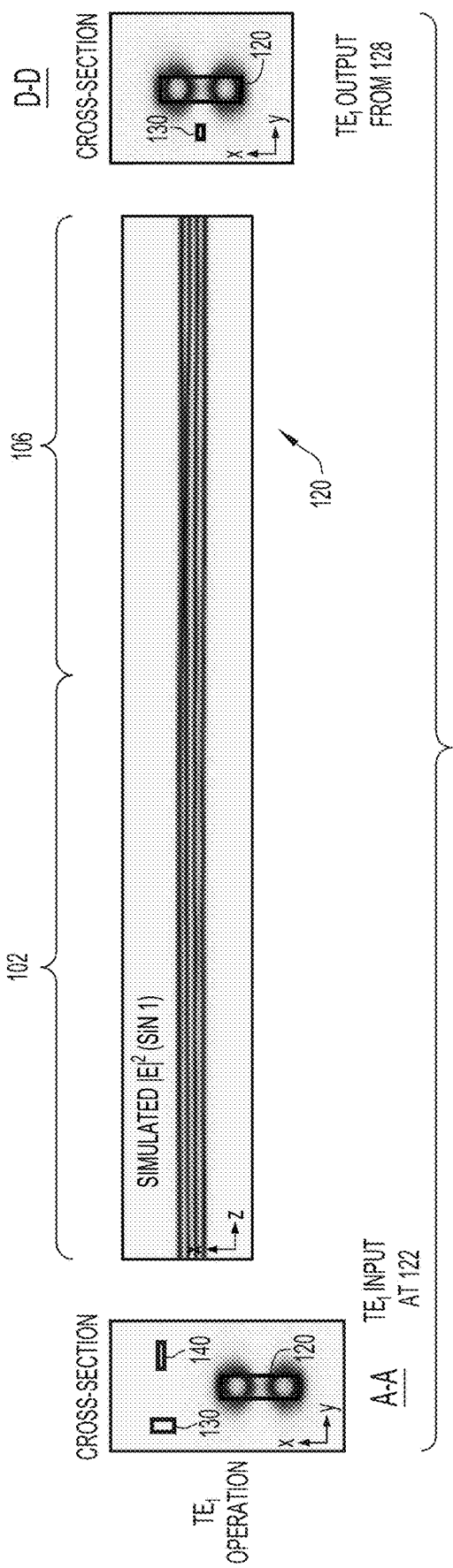

FIG. 3B shows simulated optical power of a $TE_1$ mode light signal passing through the bus waveguide 120 (SiN 1) of the modemux 100. The left side of FIG. 3B shows a cross-section of bus waveguide 120 at first end 122, lower waveguide 130 at untapered end 132, and upper waveguide 140 at first end 142 (i.e., at A-A in FIG. 1). The right side of FIG. 3B shows cross-sections of bus waveguide 120 at second end 128 and lower waveguide 130 at tapered end 138 (i.e., at D-D in FIG. 1).

Figure 3C:
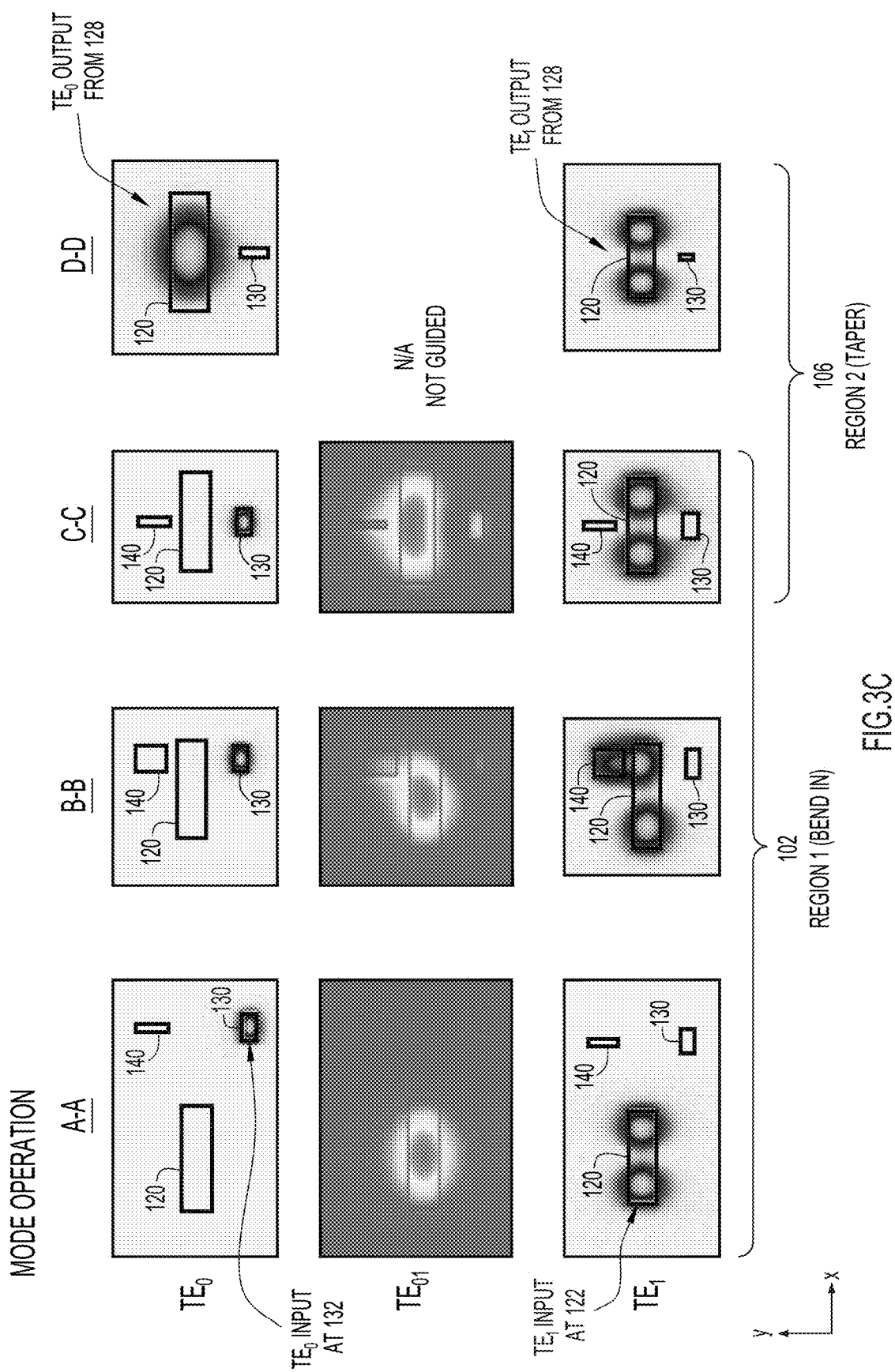

FIG. 3C shows simulated optical power of a $TE_0$ mode light signal passing through the lower waveguide 130 (Si) and the bus waveguide 120 (SiN 1), and simulated optical power of a $TE_1$ mode light signal passing through the bus waveguide 120 (SiN 1), at relative locations along the length of the modemux 100. In FIG. 3C, the lower waveguide 130 (Si) is shown below the bus waveguide 120 (SiN 1), and the upper waveguide 140 (SiN 2) is shown above the bus waveguide 120 (SiN 1). The cross-section designators A-A, B-B, C-C and D-D represent how far along the z-axis direction (refer to FIGS. 1 and 3A-3B) power measurements are detected for purposes of the simulations shown in FIG. 3C.

As can be seen from FIGS. 3A, 3B and 3C, $TE_0$ mode light introduced at the untapered end 132 of the lower waveguide 130 passes through the device and exits substantially entirely at the second end 128 of the bus waveguide 120. $TE_1$ mode light introduced at the first end 122 of the bus waveguide 120 passes through the device and exits substantially entirely at the second end 128 of the bus waveguide 120. Notably, the $TE_1$ mode light is not converted to $TE_0$ mode light as it passes through the modemux 100 described herein, unlike a standard modemux. Instead, the $TE_1$ mode light that is input into modemux 100 passes directly through the bus waveguide 120 with minimal loss. It is also noted that bus waveguide 120 guides both the $TE_1$ and $TE_0$ modes.

FIG. 4A shows simulated $TE_1$ transmission for (bend in) first region 102 of the modemux 100, and FIG. 4B shows simulated $TE_0$-$TE_1$ cross-talk for (bend in) first region 102 of the modemux 100. In a simulation for (bend in) first region 102 of modemux 100, for a device length of about ~75-80 μm, there is negligible $TE_0$ insertion loss and very low $TE_1$ insertion loss (e.g., about ~0.025 dB) as shown in FIG. 4A. There is also low $TE_0$-$TE_1$ cross-talk (e.g., less than −45 dB) as shown in FIG. 4B.

The amount or degree of shifting or translation (bend in) may be linear, or some other slowly varying continuous function, or may be adiabatically calculated, for example. In a simulation for (taper) second region 106 of modemux 100, for a device length of about ~25 μm, there is no cross-talk (theoretically), due to symmetry. The lower waveguide 130 (Si) narrows (tapers), but the bus waveguide 120 (SiN 1) does not narrow or taper. The taper shape for the lower waveguide 130 (Si) in (taper) second region 106 of modemux 100 may also be adiabatically calculated, for example.

Figure 5A:
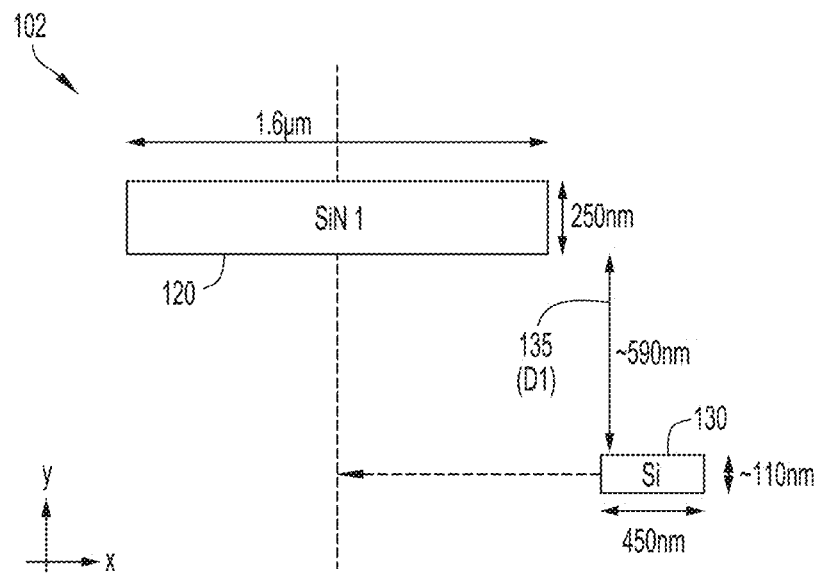
FIGS. 5A and 5B show, respectively, cross-sectional views at A-A and C-C of a variation of the modemux shown in FIG. 1, according to another example embodiment.
Figure 5B:
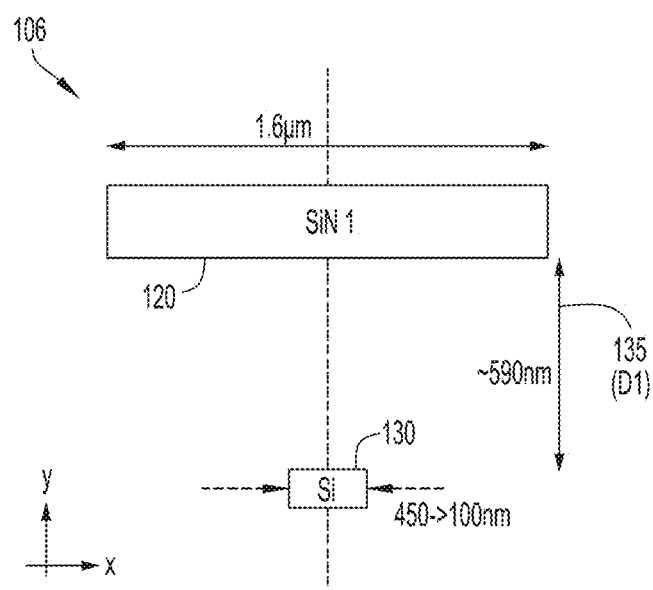

FIGS. 5A and 5B show, respectively, cross-sectional views taken at A-A and C-C of a variation of the modemux 100 shown in FIG. 1, according to another example embodiment. Instead of using a second nitride layer, such as the upper waveguide 140 (SiN 2) of FIGS. 1 and 2A-2C, FIGS. 5A-5B show a variation of a modemux that ensures the lower waveguide 130 (Si) layer and the bus waveguide 120 (SiN 1) layer are far enough away from each other to avoid the cross-talk. The large separation between these two layers reduces the $TM_0$ index, avoiding $TE_1$-$TM_0$ mode hybridization. As described above, when a silicon layer (e.g., lower waveguide 130) and a nitride layer (e.g., bus waveguide 120) are close together, translating the silicon layer across the nitride layer can result in mode hybridization (in the absence of the "pseudo-symmetry" provided by the second nitride waveguide (e.g., upper waveguide 140) in the first example embodiment above). The second example embodiment of FIGS. 5A-5B does not include the upper waveguide 140 (SiN 2), and instead utilizes a threshold distance between the bus waveguide 120 (SiN 1) and the lower waveguide 130 (Si), to avoid $TE_1$-$TM_0$ mode hybridization.

FIG. 5A shows (bend in) first region 102 at cross section A-A of FIG. 1. Bus waveguide 120 (SiN 1) has a width (in the x-axis direction) of about 1.6 μm and a thickness (in the y-axis direction) of about 250 nm. Lower waveguide 130 (Si) has a width (in the x-axis direction) of about ~450 nm and a thickness (in the y-axis direction) of about 110 nm. However, unlike the first example embodiment of FIGS. 1 and 2A-2C, there is not an upper waveguide 140 (SiN 2) in the second example embodiment of FIGS. 5A-5B. Instead, there is a gap 135 that is about 590 nm (in the y-axis direction) separating the bus waveguide 120 (SiN 1) and the lower waveguide 130 (Si). This gap 135 corresponds to a minimum threshold distance (D1) between the bus waveguide 120 (SiN 1) and the lower waveguide 130 (Si) for avoiding the $TE_1$-$TM_0$ mode hybridization described above. The lower waveguide 130 (Si) translates (bends inward towards the longitudinal axis 115) in the x-axis direction (from right to left in FIGS. 5A and 5B). In this variation, (bend in) first region 102 has a length (in the z-axis direction) of about ~70 μm, to ensure low $TE_0$→$TE_1$ cross-talk (e.g., less than −40 dB). Insertion loss is also very low.

FIG. 5B shows (taper) second region 106 at cross section C-C of FIG. 1. In FIG. 5B, the bus waveguide 120 maintains the same width of 1.6 μm in the x-axis direction, while the lower waveguide 130 (Si) narrows (tapers) in width in the x-direction (e.g., from about ~450 nm down to about ~100 nm). In this variation, (taper) second region 106 has a length (in the z-axis direction) of about ~140 μm, to have minimal loss at longer wavelengths with no cross-talk (theoretically).

In a wavelength division multiplexing (WDM) filter application, longer wavelength insertion loss is more important than shorter wavelength insertion loss, so this may be tolerable. Otherwise, a length of 180 μm (instead of 140 μm) may be useful for (taper) second region 106 according to the second example embodiment to achieve low loss across the whole O-band. It is also noted that the large gap 135 (e.g., threshold distance (D1)) between the silicon layer (e.g., lower waveguide 130 (Si)) and the nitride layer (e.g., bus waveguide 120 (SiN 1)) according to the second example embodiment makes for a long and, therefore, potentially sensitive transition (e.g., with respect to fabrication tolerances).

In some example embodiments, an adiabatic optimization algorithm can be used to calculate the profile (shape) of the silicon bend in (e.g., the lower waveguide 130 from untapered end 132 at cross-section A-A to 134 at cross-section C-C in FIG. 1). The adiabatic algorithm calculates an estimated length of ~234 μm to achieve more than 99% $TE_0$ and $TE_1$ transmission without the second nitride layer (e.g., the upper waveguide 140) according to the second example embodiment, compared to ~45 μm for the first example embodiment with the extra nitride layer (e.g., the upper waveguide 140). Thus, the addition of the upper waveguide 140 (SiN 2) in the first example embodiment of FIGS. 1 and 2A-2C results in a device that is about five times shorter in length compared to the second example embodiment of FIGS. 5A-5B. In addition, cross-talk ($TE_1$→$TE_0$) may be considered acceptable without the second nitride layer (upper waveguide 140), but may not be good enough unless (taper) second region 106 of the device is about ~140-150 μm long. Further, a device configured according to the second example embodiment of FIGS. 5A-5B may exhibit higher $TE_1$ insertion loss (scattering into $TM_0$ and $TM_1$ modes) compared to a device that is configured according to the first example embodiment of FIGS. 1 and 2A-2C.

Figure 6A:
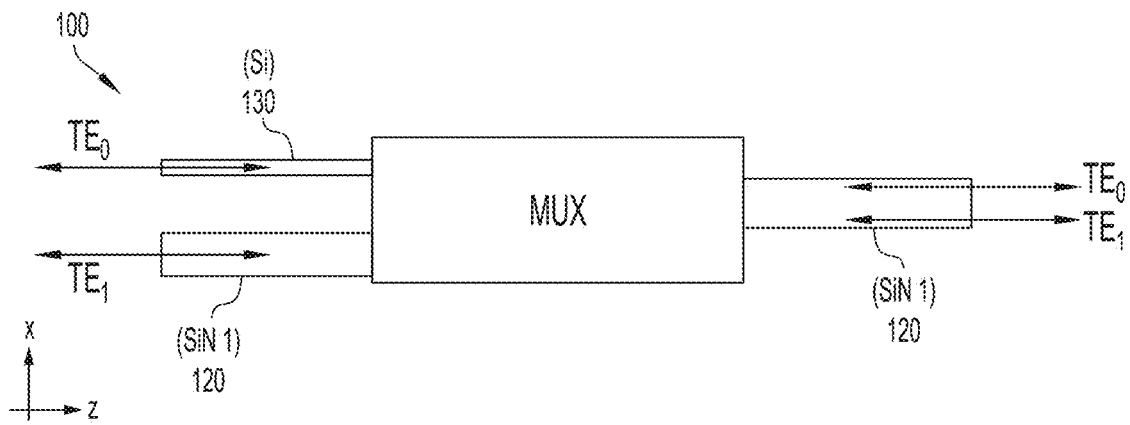
FIGS. 6A and 6B are functional block diagrams of a modemux, according to an example embodiment.
Figure 6B:
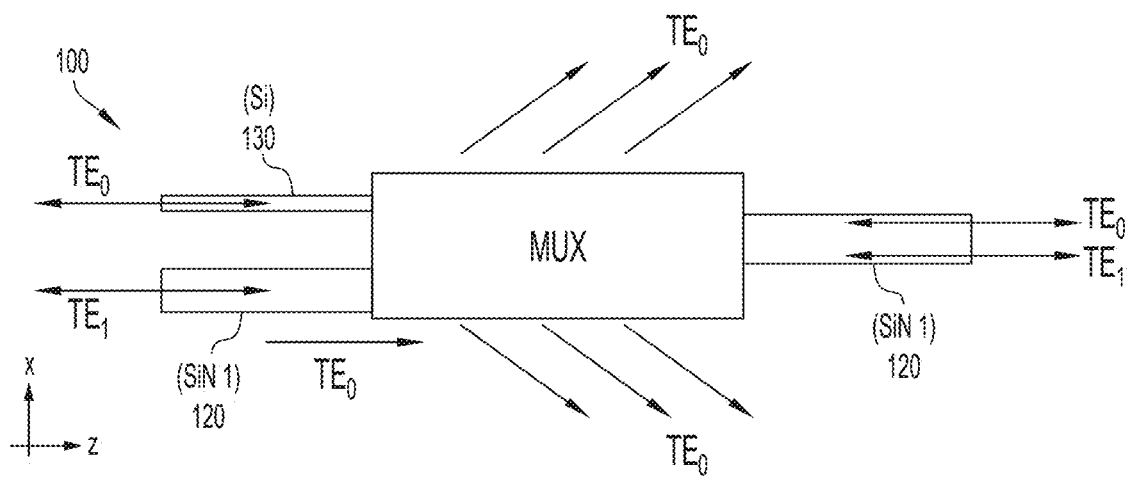

FIGS. 6A and 6B are functional block diagrams of a modemux 100, according to an example embodiment. As noted, a standard mux (not shown) converts $TE_0$ to $TE_1$. However, the modemux 100 of the present disclosure does not convert $TE_0$ to $TE_1$, as shown in FIG. 6A. Also, if $TE_0$ is launched into the nitride port (e.g., bus waveguide 120 (SiN 1)) of the modemux 100, the $TE_0$ will radiate out from modemux 100, as shown in FIG. 6B. This is not true for a standard mux in which $TE_0$ would not radiate out, but is instead converted to $TE_1$).

In some example embodiments, the bus waveguide 120 and the upper waveguide 140 may be made of dielectric materials, such as silicon nitride (SiN) or silicon oxynitride (SiON), and the lower waveguide 130 may be made of crystalline materials, such as silicon (Si), $LiNbO_3$ or InP. Bus waveguide 120, lower waveguide 130 and upper waveguide 140 may have identical or different thicknesses (in the y-axis direction).

Also, it is noted that modemux 100 can operate in either direction. From left to right in FIG. 1, modemux 100 operates as a multiplexer (one mode on each of two waveguides to two modes on one waveguide). From right to left in FIG. 1, modemux 100 operates as a demultiplexer (two modes on one waveguide to one mode of each of two waveguides). This functionality is also easily seen in FIGS. 6A and 6B.

Example Use Cases

Three example applications for the design of the modemux 100 of this disclosure, which may be implemented according to either the first example embodiment of FIGS. 1 and 2A-2C or the second example embodiment of FIGS. 5A-5B, are described below with reference to FIGS. 7, 8 and 9, respectively.

Figure 7:
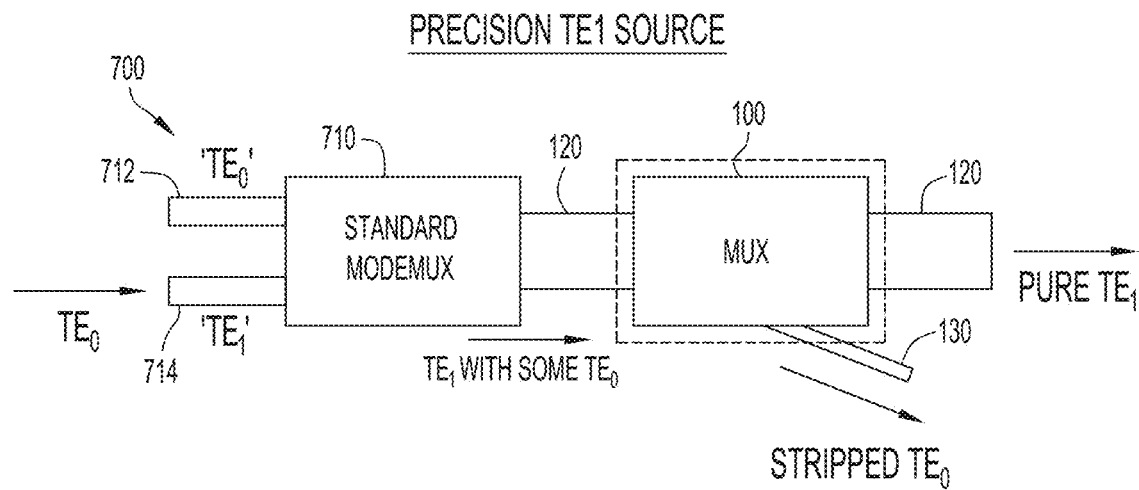
FIG. 7 is a block diagram of a use case for a modemux to provide a precision TE1 source, according to an example embodiment.

FIG. 7 is a block diagram of a use case for a modemux 100 to provide a precision $TE_1$ mode light source, according to an example embodiment. Specifically, FIG. 7 shows an apparatus 700 including a standard (or conventional) modemux 710 and a modemux 100 according to the example embodiments described above. The standard modemux 710 includes a pair of waveguides 712 and 714, and is connected to the modemux 100 via the bus waveguide 120 (SiN 1). In this example, the modemux 100 is configured to receive, from the standard modemux 710 on the bus waveguide 120, a first optical signal that includes $TE_1$ mode light mixed/combined with at least some $TE_0$ mode light. The modemux 100 is configured to strip out the $TE_0$ mode light of the first optical signal via the lower waveguide 130 (Si), and output a second optical signal on the bus waveguide (SiN 1) that includes only the $TE_1$ mode light of the first optical signal. In the apparatus 700 of FIG. 7, the modemux 100 functions as a mode stripper (i.e., $TE_1$ pass/$TE_0$ block) to generate a "pure" $TE_1$ waveguide state. For instance, this pure $TE_1$ waveguide state could be used to excite a Bragg grating, rotate into $TM_0$ with a hybridizing element, perform accurate characterization of components that use $TE_1$, or some other multi-mode based muxing application. In some variations of this example embodiment, the apparatus 700 may include multiple modemuxes 100 of the present disclosure cascaded together to provide additional $TE_0$ filtering, if needed.

Figure 8:
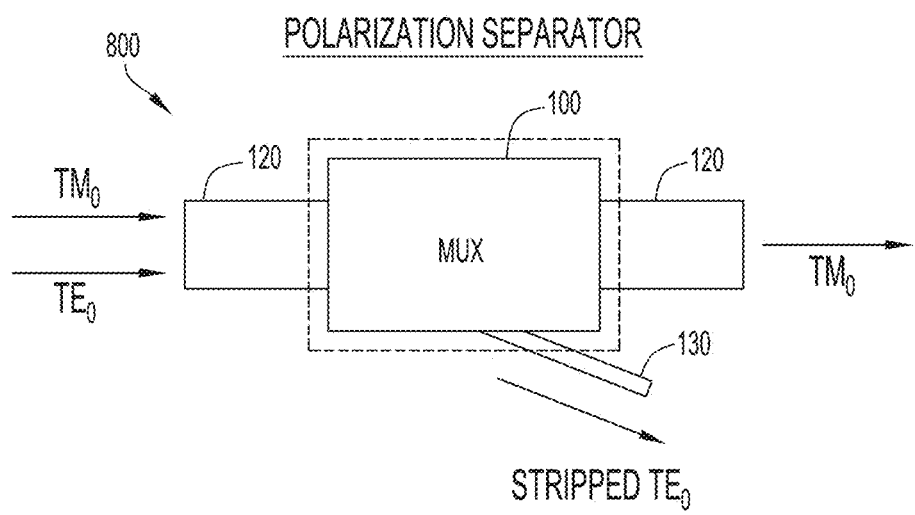
FIG. 8 is a block diagram of a use case for a modemux to provide a polarization separator, according to an example embodiment.

FIG. 8 is a block diagram of a use case for a modemux 100 to provide a polarization separator, according to an example embodiment. Specifically, FIG. 8 shows an apparatus 800 including a modemux 100 that functions as a polarization separator/multiplexer (i.e., $TM_0$ pass/$TE_0$ block) to strip out $TE_0$ and transmit $TM_0$. In this example, the modemux 100 is configured to receive a $TM_0$ mode optical signal and a $TE_0$ mode optical signal (i.e., receive a first optical signal that includes $TM_0$ mode light mixed/combined with $TE_0$ mode light) on the bus waveguide 120 (SiN). The modemux 100 is configured to strip out the $TE_0$ mode optical signal (i.e., strip out the $TE_0$ mode light of the first optical signal) via the lower waveguide 130 (Si), and output the $TM_0$ mode optical signal (i.e., output a second optical signal that includes only the $TM_0$ mode light of the first optical signal) on the bus waveguide 120 (SiN). Since $TE_1$ does not hybridize with $TM_0$, the modemux 100 component of the present disclosure has very good $TM_0$ transmission. Thus, the modemux 100 described herein also happens to be a low-loss polarization separator/mux.

Figure 9:
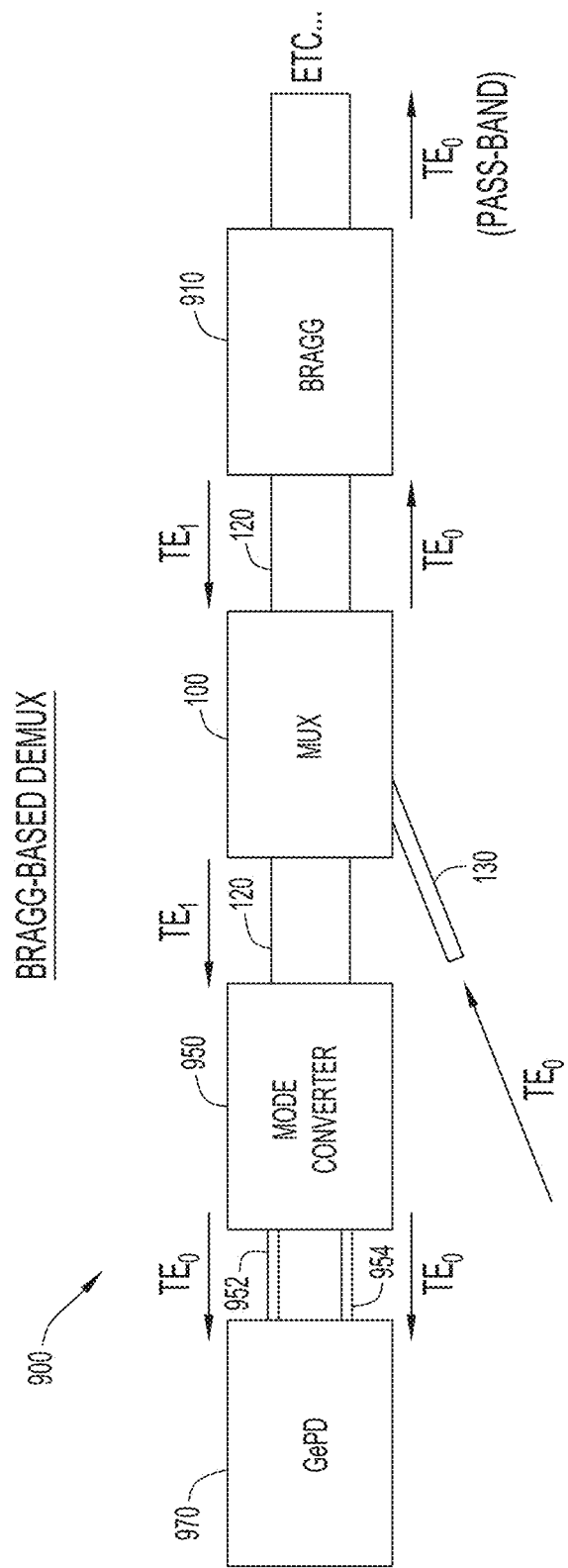
FIG. 9 is a block diagram of a use case for a modemux to provide a Bragg-based demultiplexer, according to an example embodiment.

FIG. 9 is a block diagram of a use case for a modemux 100 to provide a Bragg-based demultiplexer, according to an example embodiment. FIG. 9 shows an apparatus 900 including an adiabatic $TE_0$ mode add/drop filter (modemux) 100, a Bragg grating 910, and a $TE_1 \rightarrow TE_0$ mode converter 950. The mode converter 950 may be connected to a photodetector 970 (GePD) via one or more waveguides 952, 954. The mode converter 950 is a component that is configured to convert $TE_1$ in a multi-mode SiN waveguide into an optical signal (e.g., $TE_0$ mode light) that can be detected by the photodetector 970 (GePD). According to some example embodiments, the mode converter 950 of FIG. 9 can be implemented as any of: (i) a SiN y-splitter, and SiN→Si transitions; (ii) a SiN/Si adiabatic 3 dB splitter (also referred to as a bilayer photonic 3 dB y-splitter), or (iii) a standard SiN modemux, and a SiN→Si transition (where mode converter 950 would only have one output to photodetector 970 in this example). Thus, the modemux 100 described herein can be used for an integrated Bragg-based WDM on a receiver.

Figure 10:
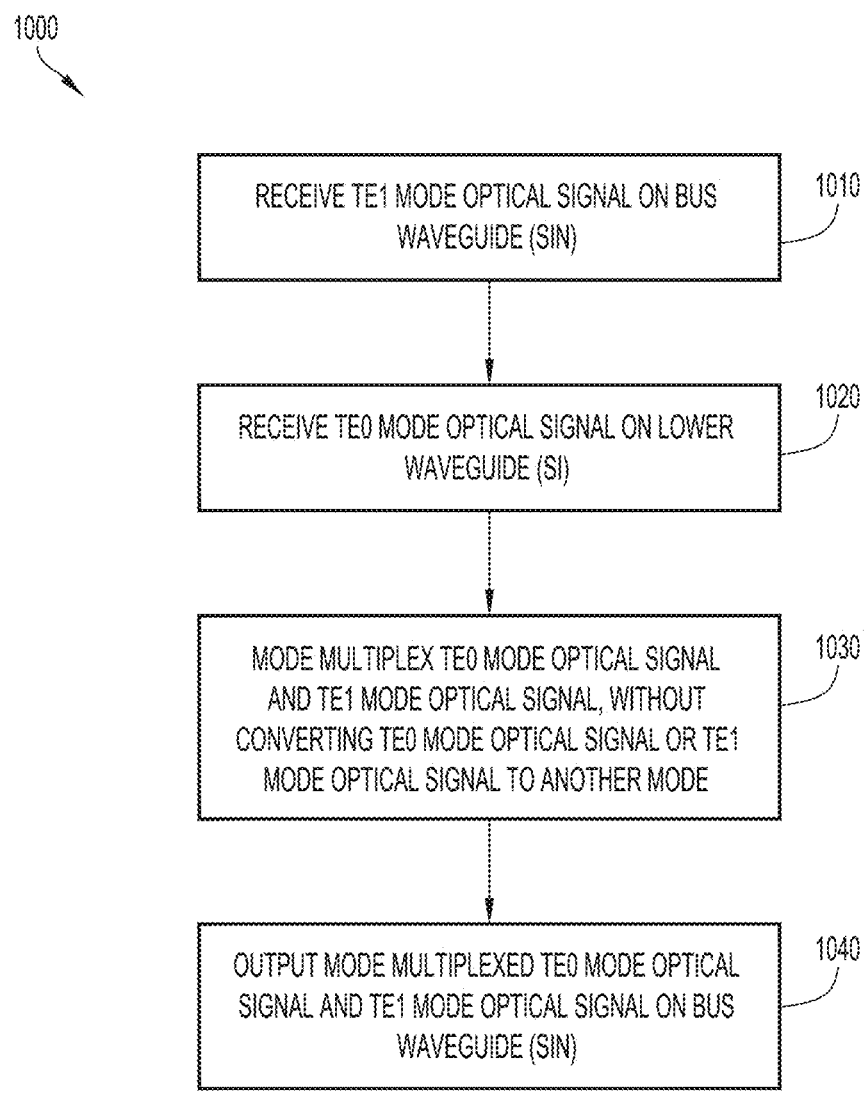
FIG. 10 is a flowchart showing a series of operations for processing light with a modemux, according to an example embodiment.

FIG. 10 is a flowchart showing a method 1000 that includes a series of operations for processing light with a modemux 100, according to an example embodiment. At step 1010, a photonic component (e.g., modemux 100) receives a $TE_1$ mode optical signal on a bus waveguide (SiN). At step 1020, the photonic component receives a $TE_0$ mode optical signal on a lower waveguide (Si) disposed below the bus waveguide (SiN). At step 1030, the photonic component mode multiplexes the $TE_1$ mode optical signal and the $TE_0$ mode optical signal, without converting the $TE_0$ mode optical signal or the $TE_1$ mode optical signal to another mode. At step 1040, the photonic component outputs the mode multiplexed $TE_0$ mode optical signal and $TE_1$ mode optical signal on the bus waveguide (SiN). The structure and operation of the photonic component (e.g., modemux 100) are configured to prevent/avoid $TE_1$-$TM_0$ mode hybridization of an optical signal that traverses the bus waveguide (SiN).

In this example, the bus waveguide (SiN) is arranged linearly from a first end (e.g., input end) to a second end (e.g., output end) of the photonic component (e.g., modemux 100). The second waveguide (Si) is arranged non-linearly from the first end to the second end and includes a bend-in section that translates towards the longitudinal axis and over a first portion of the bus waveguide (SiN), and a tapered section that overlaps with a second portion of the bus waveguide (SiN). The lower waveguide (Si) does not overlap with the first portion of the bus waveguide (SiN) at the first end of the photonic component. The lower waveguide (Si) tapers along a substantially linear portion thereof that extends along the longitudinal axis. The lower waveguide (Si) narrows at the second end of the photonic component.

In one variation of this example (refer to FIGS. 5A-5B), the lower waveguide (Si) and the bus waveguide (SiN) are separated (disposed apart from each other) by at least a minimum threshold distance, which is effective to prevent/avoid (or at least limit/inhibit/reduce) $TE_1$-$TM_0$ mode hybridization of an optical signal that traverses the bus waveguide (SiN).

In another variation of this example (refer to FIGS. 1 and 2A-2C), the photonic component (e.g., modemux 100) further includes an upper waveguide (SiN 2) disposed in the bend-in region on an opposite side above the bus waveguide (SiN 1) relative to the lower waveguide (Si). The upper waveguide (SiN 2) includes a bend-in section that translates towards the longitudinal axis and over the first portion of the bus waveguide (SiN), does not overlap with the first portion of the bus waveguide (SiN 1) at the first end of the device, and substantially matches a path of the bend-in section of the lower waveguide (Si). In an embodiment, the lower waveguide and the upper waveguide are asymmetrically distanced from the bus waveguide, although these waveguides may be similarly distanced in another embodiment. The upper waveguide (SiN 2) and the lower waveguide (Si) create a pseudo-symmetry about the longitudinal axis of the bus waveguide (SiN 1) to prevent/avoid $TE_1$-$TM_0$ mode hybridization of an optical signal that traverses the bus waveguide (SiN 1). In this variation, the lower waveguide (Si) and the upper waveguide (SiN 2) may not be disposed apart from the bus waveguide (SiN 1) by some minimum threshold distance in order to effectively prevent/avoid the $TE_1$-$TM_0$ mode hybridization.

In an embodiment, the bus waveguide (SiN 1), the lower waveguide (Si) and the upper waveguide (SiN 2) are configured to mode multiplex a first $TE_0$ mode optical signal with a first $TE_1$ mode optical signal, without converting the first $TE_0$ mode optical signal into a second $TE_1$ mode optical signal. Additionally, or alternatively, the bus waveguide (SiN 1), the lower waveguide (Si) and the upper waveguide (SiN 2) are configured to mode multiplex the first $TE_0$ mode optical signal with the first $TE_1$ mode optical signal, without converting the first $TE_1$ mode optical signal into a second $TE_0$ mode optical signal.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a device including: a bus waveguide having a longitudinal axis; a lower waveguide disposed on a first side of the bus waveguide; and an upper waveguide disposed on a second side of the bus waveguide opposite to the first side of the bus waveguide, wherein the upper waveguide substantially matches a path of the lower waveguide.

In some aspects, the bus waveguide is arranged linearly from a first end of the device to a second end of the device.

In some aspects, the device includes a bend-in region and a taper region, the lower waveguide translates towards the longitudinal axis and over a first portion of the bus waveguide in the bend-in region, and the lower waveguide overlaps with a second portion of the bus waveguide in the taper region.

In some aspects, the lower waveguide narrows at the second end of the device in the taper region.

In some aspects, the upper waveguide translates towards the longitudinal axis and over the first portion of the bus waveguide in the bend-in region.

In some aspects, the lower waveguide and the upper waveguide do not overlap with the first portion of the bus waveguide at the first end of the device in the bend-in region.

In some aspects, the upper waveguide substantially matches a path of the lower waveguide in the bend-in region, creating a pseudo-symmetry about the longitudinal axis of the bus waveguide to avoid $TE_1$-$TM_0$ mode hybridization of an optical signal that traverses the bus waveguide.

In some aspects, the bus waveguide is comprised of silicon nitride, the lower waveguide is comprised of silicon, and the upper waveguide is comprised of silicon nitride.

In some aspects, the lower waveguide and the upper waveguide are asymmetrically distanced from the bus waveguide.

In some aspects, the bus waveguide, the lower waveguide, and the upper waveguide are configured to mode multiplex a first $TE_0$ mode optical signal with a first $TE_1$ mode optical signal, without converting the first $TE_0$ mode optical signal into a second $TE_1$ mode optical signal, and without converting the first $TE_1$ mode optical signal into a second $TE_0$ mode optical signal.

In some aspects, the techniques described herein relate to a device including: a bus waveguide having a longitudinal axis, wherein the bus waveguide is arranged linearly from a first end of the device to a second end of the device; a lower waveguide disposed below the bus waveguide, the lower waveguide translating from a non-overlapping position to an overlapping position as the lower waveguide extends from the first end of the device to the second end of the device, the lower waveguide further tapering in the overlapping position towards the second end of the device; and an upper waveguide disposed above the bus waveguide and that extends along a path that at least partially matches the lower waveguide.

In some aspects, the lower waveguide does not overlap with a first portion of the bus waveguide at the first end of the device.

In some aspects, the lower waveguide tapers along a substantially linear portion thereof that extends along the longitudinal axis.

In some aspects, the bus waveguide is comprised of silicon nitride, the lower waveguide is comprised of silicon, and the upper waveguide is comprised of silicon nitride.

In some aspects, the bus waveguide, the lower waveguide, and the upper waveguide are configured to mode multiplex a first $TE_0$ mode optical signal with a first $TE_1$ mode optical signal, without converting the first $TE_0$ mode optical signal into a second $TE_1$ mode optical signal, and without converting the first $TE_1$ mode optical signal into a second $TE_0$ mode optical signal.

In some aspects, the techniques described herein relate to a method including: receiving a $TE_1$ mode optical signal on a bus waveguide; receiving a $TE_0$ mode optical signal on a lower waveguide disposed below the bus waveguide; mode multiplexing the $TE_1$ mode optical signal and the $TE_0$ mode optical signal without converting the $TE_0$ mode optical signal or the $TE_1$ mode optical signal to another mode; and outputting the $TE_0$ mode optical signal and the $TE_1$ mode optical signal on the bus waveguide.

In some aspects, the bus waveguide is comprised of silicon nitride, and the lower waveguide is comprised of silicon.

In some aspects, the method further includes creating a pseudo-symmetry about a longitudinal axis of the bus waveguide to prevent $TE_1$-$TM_0$ mode hybridization of an optical signal that traverses the bus waveguide.

In some aspects, the pseudo-symmetry is achieved with the lower waveguide and an upper waveguide disposed above the bus waveguide that at least partially follows a path of the lower waveguide.

In some aspects, the upper waveguide is comprised of silicon nitride.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A device comprising:
a bus waveguide having a longitudinal axis;
a lower waveguide disposed on a first side of the bus waveguide; and
an upper waveguide disposed on a second side of the bus waveguide opposite to the first side of the bus waveguide,
wherein the upper waveguide follows at least a portion of a path of the lower waveguide, and opposing longitudinal edges of both the lower waveguide and the upper waveguide, along the at least a portion of the path, are located between longitudinal edges of the bus waveguide.

2. The device of claim 1, wherein the bus waveguide is arranged linearly from a first end of the device to a second end of the device.

3. The device of claim 2, wherein the device includes a bend-in region and a taper region,
the lower waveguide translates towards the longitudinal axis and over a first portion of the bus waveguide in the bend-in region, and
the lower waveguide overlaps with a second portion of the bus waveguide in the taper region.

4. The device of claim 3, wherein the lower waveguide narrows at the second end of the device in the taper region.

5. The device of claim 3, wherein the upper waveguide translates towards the longitudinal axis and over the first portion of the bus waveguide in the bend-in region.

6. The device of claim 5, wherein the lower waveguide and the upper waveguide do not overlap with the first portion of the bus waveguide at the first end of the device in the bend-in region.

7. The device of claim 6, wherein the upper waveguide follows a path of the lower waveguide in the bend-in region, creating a pseudo-symmetry about the longitudinal axis of the bus waveguide to avoid $TE_1$-$TM_0$ mode hybridization of an optical signal that traverses the bus waveguide.

8. The device of claim 1, wherein the bus waveguide is comprised of silicon nitride, the lower waveguide is comprised of silicon, and the upper waveguide is comprised of silicon nitride.

9. The device of claim 1, wherein the lower waveguide and the upper waveguide are asymmetrically distanced from the bus waveguide.

10. The device of claim 1, wherein the bus waveguide, the lower waveguide, and the upper waveguide are configured to mode multiplex a first $TE_0$ mode optical signal with a first $TE_1$ mode optical signal, without converting the first $TE_0$ mode optical signal into a second $TE_1$ mode optical signal, and without converting the first $TE_1$ mode optical signal into a second $TE_0$ mode optical signal.

11. A device comprising:
a bus waveguide having a longitudinal axis, wherein the bus waveguide is arranged linearly from a first end of the device to a second end of the device;
a lower waveguide disposed below the bus waveguide, the lower waveguide translating from a non-overlapping position with respect to the bus waveguide to an overlapping position with respect to the bus waveguide as the lower waveguide extends from the first end of the device to the second end of the device, the lower waveguide tapering in the overlapping position towards the second end of the device; and
an upper waveguide disposed above the bus waveguide and that extends along at least a portion of a path of the lower waveguide,
wherein opposing longitudinal edges of both the lower waveguide and the upper waveguide, along the at least a portion of the path of the lower waveguide, are located between longitudinal edges of the bus waveguide.

12. The device of claim 11, wherein the lower waveguide does not overlap with a first portion of the bus waveguide at the first end of the device.

13. The device of claim 11, wherein the lower waveguide tapers along a portion thereof that extends along the longitudinal axis.

14. The device of claim 11, wherein the bus waveguide is comprised of silicon nitride, the lower waveguide is comprised of silicon, and the upper waveguide is comprised of silicon nitride.

15. The device of claim 11, wherein the bus waveguide, the lower waveguide, and the upper waveguide are configured to mode multiplex a first $TE_0$ mode optical signal with a first $TE_1$ mode optical signal, without converting the first $TE_0$ mode optical signal into a second $TE_1$ mode optical signal, and without converting the first $TE_1$ mode optical signal into a second $TE_0$ mode optical signal.

16. A method comprising:
receiving a $TE_1$ mode optical signal on a bus waveguide;
receiving a $TE_0$ mode optical signal on a lower waveguide that is disposed on a layer below the bus waveguide;
causing the $TE_0$ mode optical signal on a lower waveguide to interact with an upper waveguide disposed on a layer above the bus waveguide to mode multiplex the $TE_1$ mode optical signal and the $TE_0$ mode optical signal without converting the $TE_0$ mode optical signal or the $TE_1$ mode optical signal to another mode; and
outputting the $TE_0$ mode optical signal and the $TE_1$ mode optical signal on the bus waveguide,
wherein opposing longitudinal edges of both the lower waveguide and the upper waveguide, along at least a portion of respective paths of the lower waveguide and the upper waveguide, are located between longitudinal edges of the bus waveguide.

17. The method of claim 16, wherein the bus waveguide is comprised of silicon nitride, and the lower waveguide is comprised of silicon.

18. The method of claim 17, further comprising creating a pseudo-symmetry about a longitudinal axis of the bus waveguide to prevent $TE_1$-$TM_0$ mode hybridization of an optical signal that traverses the bus waveguide.

19. The method of claim 18, wherein the pseudo-symmetry is achieved with the lower waveguide and the upper waveguide follow matching paths.

20. The method of claim 19, wherein the upper waveguide is comprised of silicon nitride.

* * * * *